United States Patent [19]

Malinge et al.

[11] 4,415,347

[45] Nov. 15, 1983

[54] DEVICE AND METHOD FOR PREPARING MULTI-FIBER OPTICAL CABLES FOR BUTT-JOINTING

[75] Inventors: Jean L. Malinge; Marie C. Soster; Dominique Lamarche, all of Paris, France

[73] Assignee: Socapex, Suresnes, France

[21] Appl. No.: 333,862

[22] PCT Filed: Sep. 4, 1981

[86] PCT No.: PCT/FR81/00115
§ 371 Date: Dec. 15, 1981
§ 102(e) Date: Dec. 15, 1981

[30] Foreign Application Priority Data

Sep. 5, 1980 [FR] France .................. 80 19255

[51] Int. Cl.³ ............... C03B 37/10; C03B 37/14
[52] U.S. Cl. ........................... 65/4.21; 65/152
[58] Field of Search .......... 65/152, 4.21; 156/158, 156/159; 350/96.21, 96.22; 29/461; 269/902, 909

[56] References Cited

U.S. PATENT DOCUMENTS

| | | | |
|---|---|---|---|
| 3,793,117 | 2/1974 | Brooks | 156/158 X |
| 4,017,013 | 4/1977 | Hawk et al. | 225/96.5 |
| 4,028,162 | 6/1977 | Cherin et al. | 65/4.21 X |
| 4,146,301 | 3/1979 | Cherin et al. | 350/96.21 |
| 4,345,137 | 8/1982 | Mignien et al. | 350/96.21 X |

*Primary Examiner*—Richard V. Fisher
*Attorney, Agent, or Firm*—Cushman, Darby & Cushman

[57] ABSTRACT

This invention concerns a device to spread out flat the fibres of an optical cable, which has first been stripped, so that the fibres can be cut across precisely aligned cross-sections, thereby allowing them to be butt-jointed individually with the fibres of another cable, in a splicing operation.

This device comprises hand-operated mechanical means of inserting blades, positioned on a diametrical plane of the cable, to separate the fibres into two groups. One blade acts as a stop, while the first group of fibres is being gathered into the notches of one comb, while the other blade performs the same function for a second comb. The combs and blades are then made to rotate in opposite directions, flattening out the group of fibres on a horizontal plane.

This device can be applied to optical fibres used for telecommunications.

17 Claims, 14 Drawing Figures

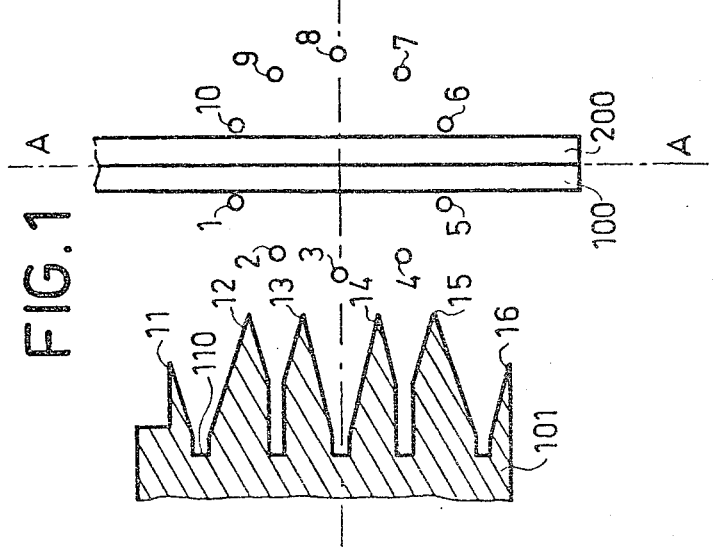
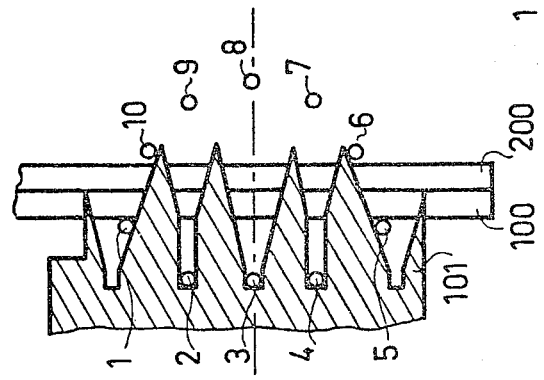
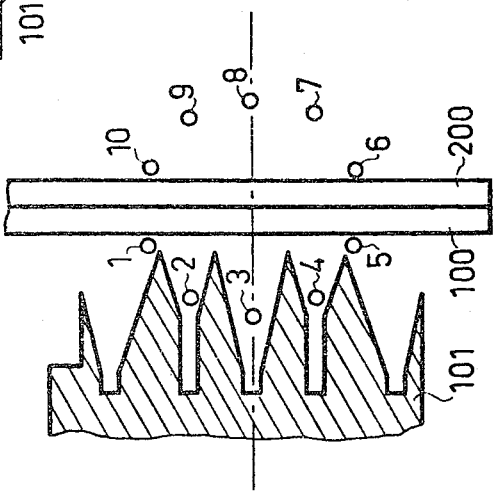
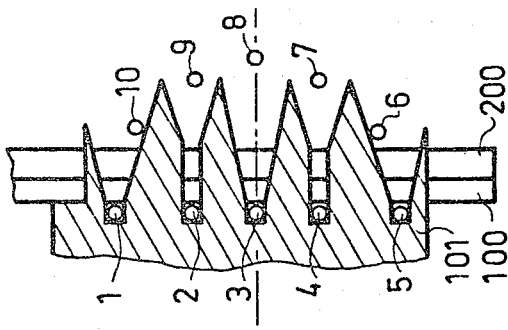

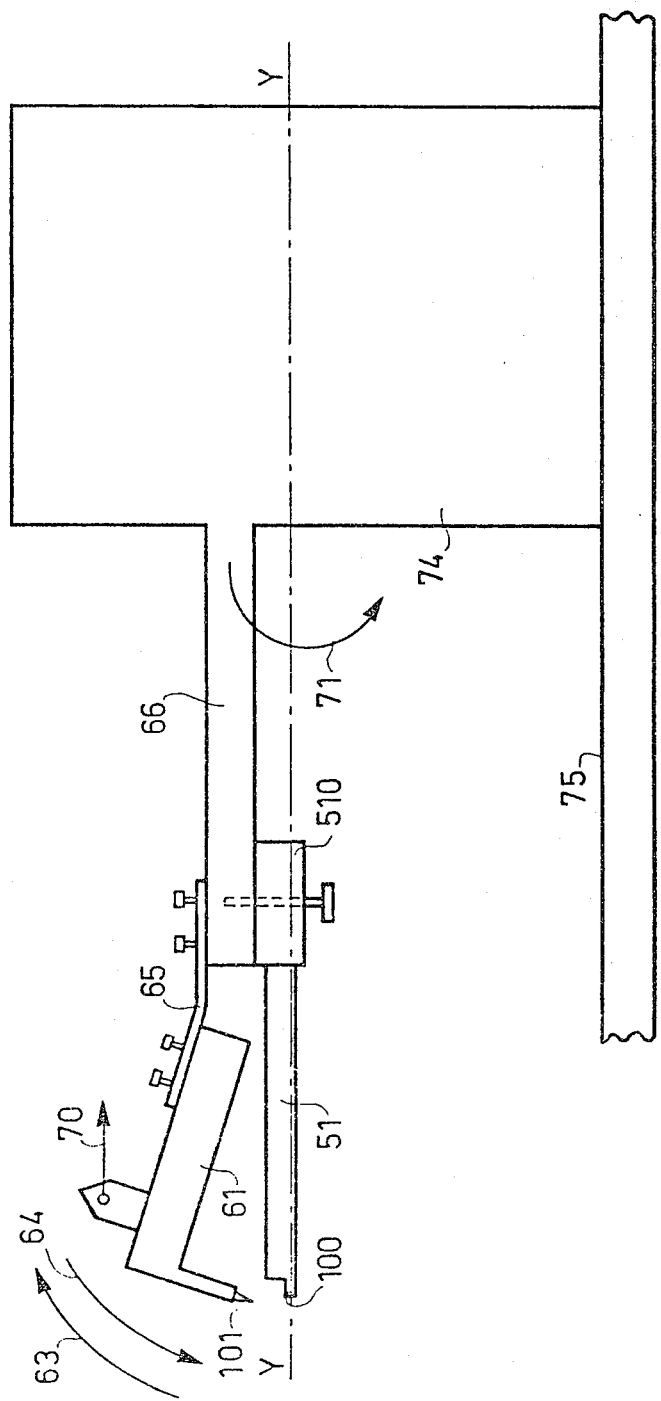

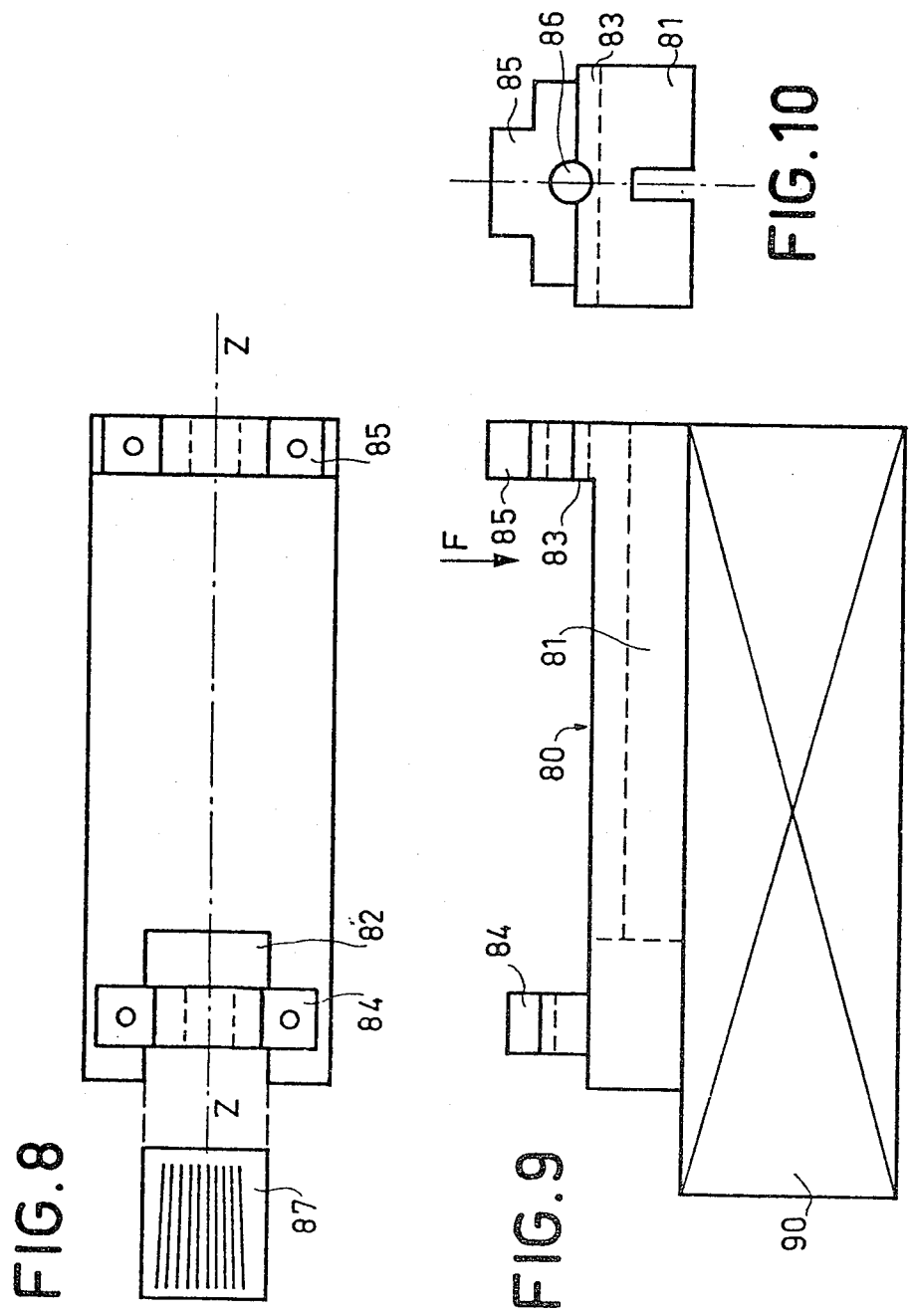

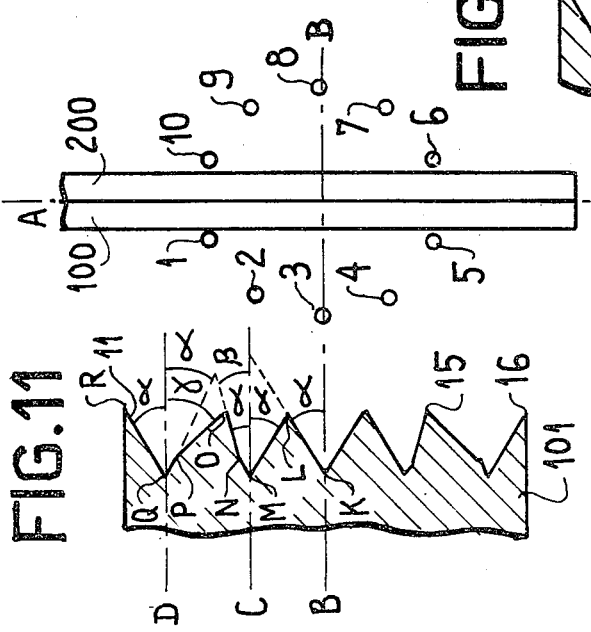
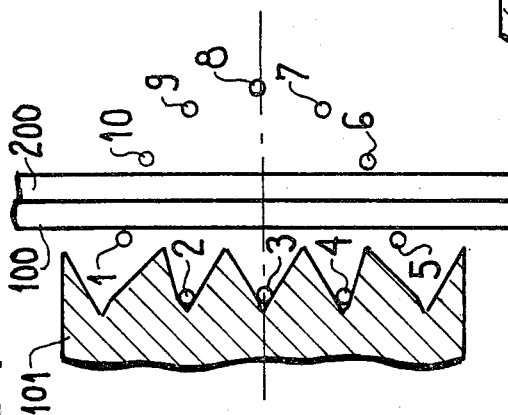
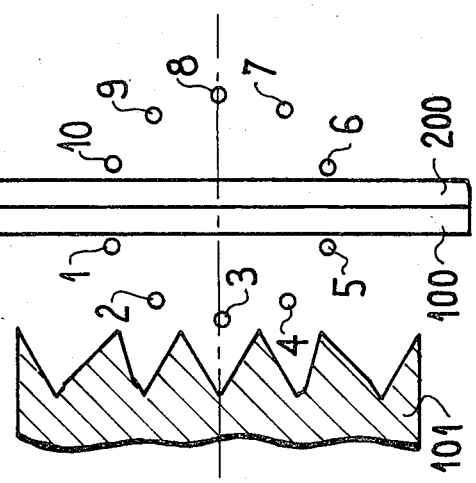
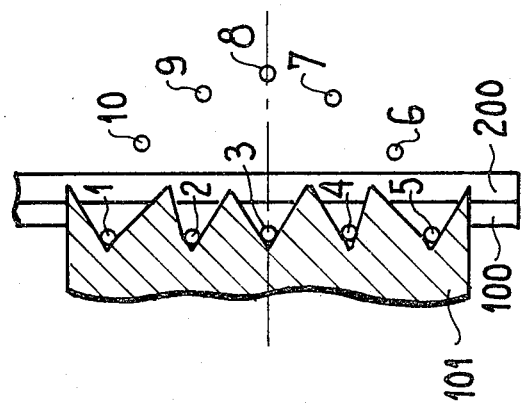

DEVICE AND METHOD FOR PREPARING MULTI-FIBER OPTICAL CABLES FOR BUTT-JOINTING

BACKGROUND OF THE INVENTION

This invention concerns a device to prepare cables comprising a number of optical fibres, so that they can be joined fibre by fibre. More specifically, this device is designed to allow the connecting of two cables, each containing ten fibres, positioned in spiral grooves round the circumference of a central insulating core, so that the fibres form a twisted cluster.

The best way of splicing two optical cables is to position the fibres on the same plane, cut them along perfectly straight cross-sections, which are perfectly aligned, then weld them by placing the two prepared cables end to end, with each pair of fibres in contact.

It is a very difficult technique to apply accurately, and this invention describes a device to prepare optical cables for connection in this way, by spreading out the fibres along a portion of each cable on a single plane. This device comprises a comb, containing indentations which engage with the fibres situated on one side of a diametrical plane of the cable, and a second comb, which engages similarly with the fibres on the other side of this diametrical plane, and further comprises means of positioning on a single plane all the fibres thus engaged by separate rotation of these combs.

SUMMARY OF THE INVENTION

Accordingly, a primary object of the invention is to provide such a device, comprising one or more combs containing indentations separated by teeth, the profile of each such indentation being adapted to suit the profiles of the adjoining teeth, and these indentations being capable of engaging with the cable fibres.

Another object of this invention is to provide such a device in which the base of each indentation is equidistant from the bases of adjacent indentations in each comb.

Another object of the invention is to provide such a device, comprising two combs, one such comb being intended to engage with the group of fibres situated on one side of a diametrical plane through the cable, and the second being intended to engage with the group of fibres situated on the other side of this diametrical plane.

Another object of the invention is to provide such a device, in which the profile of the teeth of each comb is designed to prevent disturbing the group of fibres on the other side of the diametrical plane.

Another object of the invention is to provide such a device, in which each comb is supported by an arm, attached to a comb handle, each arm being mobile in relation to the other arm, around the same axis of rotation, in order to spread out both groups of fibres on a single horizontal plane.

BRIEF DESCRIPTION OF THE DRAWINGS

Other features of the invention will be made clear by the following description of one possible embodiment of the invention, with reference to the accompanying illustrations:

FIGS. 1 to 4, showing the different phases of engagement of the optical fibers in the comb indentations;

FIG. 7, showing mechanical means of operating the combs, and accompanying components;

FIGS. 8, 9 and 10, showing the means of gripping the cable and the fibres emerging from it, seen from different angles; and FIGS. 11 to 14, showing the different phases illustrated in FIGS. 1 to 4, using one recommended form of comb.

DETAILED DESCRIPTION OF A PREFERRED EMBODIMENT

Figure 5:
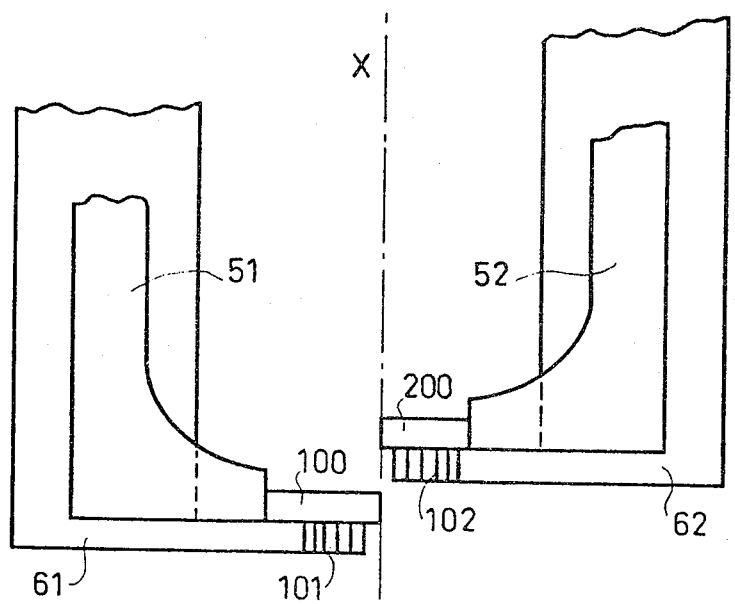
FIGS. 5 and 6, showing part of the system of operating the combs, seen from different angles.

FIG. 1 shows a cross-sectional view of the fibres 1 to 10 of an optical cable (the other parts of which are not shown here). The cable has first been stripped to disengage the ten fibres, and the central insulating core has been cut across in the stripped portion. Means that will be described later are used to immobilize the unstripped part, and the fibres are repositioned in a circular pattern at the end of the cable.

The fibres are separated into two groups, on each side of a vertical plane AA, by inserting two blades 100 and 200. The combs and blades are offset along the cable, to prevent them interfering with one another. This is shown more clearly in FIG. 5, which shows a second comb 102. If the plane of FIG. 1 is the median cross-sectional plane of the first comb 101, the blade 100 is located to the rear of the plane, and the other blade 200 still further back.

The first comb 101 has six teeth 11 to 16, with five indentations 110 between them. The base of each indentation is equidistant from the bases of adjacent indentations: in other words, they are equal intervals apart. The profile of each indentation is adapted to suit the profiles of the adjoining teeth, which are not equidistant, so as to be able to engage fibres positioned in a semi-cylindrical pattern. The profile of the teeth is also designed not to disturb the positions of the group of fibres on the opposite side of the plane AA. Finally, when the device is properly adjusted, the median plane of the middle indentation coincides with a diametrical plane perpendicular to AA.

FIGS. 2, 3 and 4 show the relative positions of fibres and teeth during the engagement operation. In FIG. 2, none of the fibres have yet been moved from their original positions. In FIG. 3, all the first group of fibres (1 to 5) are in contact with the teeth of the comb, with only fibres 2 to 4 fully engaged in the appropriate indentations. In FIG. 4, all five fibres 1 to 5 are fully engaged in the indentations. It should be noted that the shape of the teeth ensures that fibres 6 to 10 are not moved from their original positions by the movement of comb 101. The two combs do not interfere with each other, as can be seen in FIG. 5.

FIGS. 1 to 4 show the distances of notches and the outlines of teeth. The points of teeth 12 to 15 are positioned in such a way that their projection along the plane XX is equidistant from the projections on the same plane of fibres 1 and 2 (for tooth 12), 2 and 3 (for tooth 13), and so on. FIGS. 3 and 4 also reveal that the profiles of teeth 12 and 15 are designed not to disturb fibres 6 and 10 during the operation.

FIG. 5 shows the mechanical parts or "handles" 61 and 62 of combs 101 and 102, seen edgewise, in the form of parallel lines representing teeth and notches (only a few of which are shown, to simplify the illustration). The handles 51 and 52 of blades 100 and 200 can also be seen.

Figure 6:
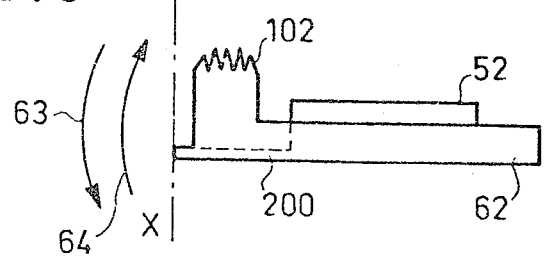

FIG. 6 shows the outline of the comb 102, with part of its handle 62. The blade 200 is similarly shown with part of its handle 52. The comb is jointed in the directions shown by the arrows 63 and 64, so that it can engage with the fibres.

FIG. 7 illustrates the mechanics of this jointing system, in the form of a diagrammatical or symbolic view of the means of operating a comb, and the accompanying separator blade. Such means are partly duplicated, to allow both combs and both blades to be used simultaneously, the handles being constructed and positioned in such a way as not to interfere with each other.

A block 74 moves along a slide 75, to allow two arms, each supporting a comb and a blade, to be operated. An arm 66 is attached to the handle 61 of the comb 101 and to the handle 51 of the blade 100.

Although this is not visible in FIG. 7, it should be noted that the median plane of the comb 101 (see cross-sectional views in FIGS. 1 to 4) and the plane of the blade 100 are at right angles to the plane of FIG. 7, since these planes must be perpendicular to the cable axis (XX in FIG. 5).

The block 74 performs the following movements, by means of manual controls not shown here:

a—movements of the comb 101 in relation to the blade 100, in the directions of the arrows 63 and 64; this is made possible by the spring blade 65 between the handle 61 and arm 66; manual control is exerted in the direction of the arrow 70, by means of an intermediate arm (not shown here), which slides on the arm 66; and b—a rotary movement of the arm 66 and blade handle 51, in the direction of the arrow 71, round an axis YY, which passes through the blade and which more or less coincides with the optical cable axis; the arm 66 is attached to the handle 51 by rigid mechanical means.

FIGS. 8, 9 and 10 show a clip which also forms part of the device. This is used to grip the cable during stripping of the protective casing and cutting of the central core, and to hold the unstripped part while the fibres are being positioned on a horizontal plane, using the system described above.

This clip comprises a platform 80, forming the upper part of a fairly thick base 81, one end of which contains a wide rectangular slot 82. A wedge 87, the top of which contains indentations positioned in such a way as to guide the optical fibres on the horizontal plane of the platform 80, fits into the slot 82. The other end of the clip comprises a raised part 83. There are two collars 84 and 85. The first collar 84 spans the slot 82, and the second collar 85 covers the raised part 83. The undersides of these collars and the surfaces facing them are machined in such a way as to leave a circular passage 86 for the optical cable, located on axis ZZ, which represents the optical cable axis prior to preparation.

Preparation of the optical cable comprises the following stages:

stripping the cable over a length equal to twice or three times the length of the clip;

fitting of the cable to the clip, the end of the unstripped part being gripped by the collar 85, so that the unstripped part begins at the position indicated by the arrow F on FIG. 9, i.e. a few millimeters from the collar 85, above the platform 80; at this stage in operations, the collar 84 is not yet fitted;

spreading-out of the optical fibres, to release the central core and allow it to be cut without damaging the fibres;

re-establishment of the original positions of the optical fibres round the stripped cable;

primary movement of the block 74 and of the means of operating the comb and blade handles, in order:
  a. to insert the blades along a vertical plane, level with the arrow F in FIG. 9;
  b. to position the combs ready to engage with the groups of fibres, as shown in FIGS. 1 to 4;

secondary movement of the block 74, causing the fibres to slide inside the comb indentations, in order to remove the blades and combs from the support 90 in FIG. 9, which holds the clip during these operations;

performance of the movement of flattening out the fibres, by means of two 90° rotations of the handles in opposite directions;

fitting of the wedge 87, and positioning of fibres; and tightening of the collar 84.

The fibres are then ready to be cut precisely, so that their ends will be aligned.

FIGS. 11 to 14 illustrate the same sequence of phases as in FIGS. 1 to 4, using a recommended embodiment of the comb. In these figures, the same components bear the same references as in FIGS. 1 to 4. The comb 101 is placed symmetrically on the axis BB passing through the point K. This comb also contains six teeth. The part KL of tooth 13 forms an angle $\alpha$ of approximately 30° to the axis BB, or to the vertical. The part ML of tooth 13 also forms an angle $\alpha$ to the vertical, as does the part MN of tooth 12. At the point N of this tooth, near point M (the distance between the two being approximately the diameter of the optical fibres), the tooth 12 takes on a steeper gradient, so that the part NO is at an angle $\beta$ to the vertical, or to the axis CC. This angle $\beta$ is smaller than the angle $\alpha$, and may be approximately 15°, i.e. half the size of angle $\alpha$. The part OP of tooth 12 forms another angle $\gamma$ to the vertical, or to the axis DD. This angle $\gamma$ is larger than angle $\alpha$, being approximately 45°. The part PQ of tooth 12 forms an angle $\alpha$ to the vertical, or the axis DD, in the same way as the part QR of tooth 11. The procedure illustrated in FIGS. 11 to 14 shows the advantages of this particular embodiment of the comb. If the optical fibre 3 is positioned approximately on the axis BB, corresponding to the base of the indentation between teeth 13 and 14, the point of each of the teeth L, O and R will be absolutely accurately positioned in relation to the fibres, in other words approximately mid-way between them. This allows the positioning of fibre 3 in relation to the base of indentation K to be rather less precise, while ensuring that one fibre will slide into each indentation. FIGS. 1 to 4 show that, with the type of comb illustrated there, end fibres 1 and 5 are very close to the teeth 12 and 15, so that it may possibly go wrong during operations, for instance, by allowing both fibres 4 and 5 to pass between teeth 14 and 15.

The values of the angles $\alpha$, $\beta$ and $\gamma$ are stated only for guidance, and the invention is in no way confined to such values, which are merely particularly suitable for use with normal-sized cables, with a cross-sectional area of a few millimeters.

What is claimed is:

1. A device for preparing a multi-fiber optical cable for butt-jointing the ends of the fibers with the ends of other fibers of a multi-fiber optical cable, the individual fibers of the cable being circularly arranged as viewed in cross-section, said device comprising:

at least one comb means defining alternating plural teeth and plural recesses into which individual fibers of a first grouping of fibers are receivable, said comb means including means defining tooth-profile surfaces for permitting individual ones of said teeth to be disposed between adjacent ones of said predetermined grouping of said fibers and for encouraging each of said fibers of said predetermined grouping to be received in a respective one of said recesses to move the fibers of said predetermined grouping from their initial position in which the fiber ends of said predetermined grouping, together with the other fiber ends of said cable, are circularly arranged to a second position wherein said ends of said predetermined grouping of fibers are linearly disposed; and moving means connected to said comb means for moving said comb means in an approaching direction relative said predetermined grouping of fibers to responsively encourage said fibers to move from said initial position to said second position.

2. A device as in claim 1 further comprising divider means operatively associated with said comb means for segregating said predetermined grouping of fibers from said other fibers of said cable and for holding said predetermined grouping of fibers in their said second position.

3. A device as in claim 1 or 2 wherein said moving means includes means for rotating said comb means to responsively rotate said linearly disposed fiber ends of said predetermined grouping while in said second position between a first linear orientation and a second linear orientation.

4. A device as in claim 3 further comprising mounting means for mounting said comb means for reciprocal sliding movement.

5. A device for preparing a multi-fiber optical cable for butt-jointing the ends of the fibers with the ends of other fibers of a multi-fiber optical cable, the individual fibers of the cable being circularly arranged as viewed in cross-section, said device comprising:

first comb means defining alternating plural first teeth and plural first recesses into which individual fibers of a first fiber grouping are receivable, said first comb means including means defining first tooth-profile surfaces for permitting individual ones of said first teeth to be disposed between adjacent fibers of said first grouping and for encouraging each of said fibers in said first grouping to be received in a respective one of said first recesses to move the fibers of said first grouping from an initial position wherein the fiber ends of said first grouping of fibers together with the fiber ends of a second grouping of fibers are circularly arranged to a second position wherein said ends of said first grouping of fibers are linearly disposed;

second comb means defining alternating plural second teeth and plural second recesses into which individual fibers of said second grouping are receivable, said second comb means including means defining second tooth profile surfaces for permitting individual ones of said second teeth to be disposed between adjacent fibers of said second grouping of fibers and for encouraging each of said fibers in said second grouping to be received in a respective one of said second recesses to move the fibers of said second grouping from an initial position wherein the fiber ends of said second grouping of fibers together with the fiber ends of said first grouping of fibers are circularly arranged to a second position wherein said ends of said second grouping of fibers are linearly disposed; and moving means connected to said first and second comb means for moving said first comb means in a first approaching direction relative said first grouping of fibers to responsively encourage said fibers of said first grouping to move from their said initial position to their said second position, and for moving said second comb means in a second approaching direction, substantially opposing said first approaching direction, relative said second grouping of fibers to responsively encourage said fibers of said second grouping to move from their said initial position to their said second position; whereby the ends of the fibers of said first and second groupings are disposed in respective first and second substantially parallel linear rows when each are in their respective second positions.

6. A device as in claim 5 further comprising divider means operatively associated with said first and second comb means for segregating said circularly arranged fibers into said first and second groupings of fibers and for respectively holding said first and second groupings of fibers in their said respective second position relative said first and second comb means.

7. A device as in claim 5 and 6 wherein said moving means includes means for rotating said first and second comb means in opposite directions to move said first and second linear rows out of said parallel arrangement and to dispose said first and second rows in substantially colinear relative alignment.

8. A device as in claim 7 further comprising mounting means for mounting said first and second comb means for respective reciprocal sliding movement.

9. A device as in claim 8 wherein said mounting means includes means for gripping said cable to fixedly hold said cable in place.

10. An apparatus for preparing a multi-fiber optical cable, of the type wherein the individual fibers are circularly arranged, for butt-jointing the ends of the fibers with the ends of other fibers of a multi-fiber optical cable, said apparatus comprising:

means for separating the individual circularly arranged fibers into first and second groupings of fibers;

a first comb-like structure defining alternating plural first teeth and plural first recesses;

a second comb-like structure defining alternating plural second teeth and plural second recesses;

first means for moving said first comb-like structure in an approaching direction relative the first grouping of fibers to dispose individual ones of the first teeth between adjacent ones of the individual fibers of the first grouping and to allow the individual fibers of the first grouping to be received in respective ones of the first receses so as to linearly dispose the ends of the individual fibers thereof; and second means for moving said second comb-like structure in an approaching direction relative the second grouping of fibers to dispose individual ones of the second teeth between adjacent ones of the individual fibers of the second grouping and to allow the individual fibers of the second grouping to be received in respective ones of the second recesses so as to linearly dispose the ends of the individual fibers thereof.

11. An apparatus as in claim 10 wherein the first and second groupings of fibers are linearly disposed in respective first and second parallel rows by said first and second moving means and wherein said apparatus further comprises:
   means for rotating the first and second comb-like structures in opposite directions to move the first and second rows out of their parallel arrangement and to dispose the first and second rows in substantially colinear relative alignment.

12. A method of preparing a multi-fiber optical cable, of the type wherein the individual fibers are circularly arranged, for butt-jointing the ends of the fibers with the ends of other fibers of a multi-fiber optical cable, said method comprising the steps of:
   (a) moving a comb-like structure defining alternating plural teeth and plural recesses in an approaching direction relative a first grouping of individual fibers of the cable to dispose individual ones of the teeth between adjacent ones of the individual fibers of the first grouping; and
   (b) allowing the individual fibers of the first grouping to be received in respective ones of the recesses so as to linearly dispose the ends of the individual fibers of the first grouping.

13. A method as in claim 12 wherein prior to step (a) there is practiced the step of:
   (i) separating predetermined ones of the circularly arranged fibers of the cable into said first grouping of fibers.

14. A method as in claim 12 or 13 further comprising the step of:
   (c) rotating the comb-like structure having the ends of the individual fibers of the first grouping linearly disposed in the respective recesses thereof to rotate the first grouping of fiber ends between a first linear orientation and a second linear orientation.

15. A method as in claim 13 wherein prior to step (i) there is practiced the step of securely clamping the cable in place.

16. A method of preparing a multi-fiber optical cable, of the type wherein the individual fibers are circularly arranged, for butt-jointing the ends of the fibers with the ends of other fibers of a multi-fiber optical cable, said method comprising the steps of:
   (a) separating the individual circularly arranged fibers into first and second groupings;
   (b) moving a first comb-like structure defining alternating plural first teeth and plural first recesses in an approaching direction relative the first grouping of fibers to dispose individual ones of the first teeth between adjacent ones of the individual fibers of the first grouping;
   (c) moving a second comb-like structure defining alternating plural second teeth and plural second recesses in an approaching direction relative the second grouping of fibers to dispose individual ones of the second teeth between adjacent ones of the individual fibers of the second grouping;
   (d) allowing the individual fibers of the first grouping to be received in respective ones of the first recesses so as to linearly dispose the ends of the individual fibers thereof; and
   (e) allowing the individual fibers of the second grouping to be received in respective ones of the second recesses so as to linearly dispose the ends of the individual fibers thereof.

17. A method as in claim 16 wherein steps (a)-(e) are practiced so that the first and second groupings of fibers are linearly disposed in respective first and second parallel rows and wherein the method further comprises the step of:
   (f) rotating the first and second comb-like structures in opposite directions to move the first and second rows out of their parallel arrangement and to dispose the first and second rows in substantially colinear relative alignment.

* * * * *